United States Patent [19]

Savoca

[11] Patent Number: 4,914,287

[45] Date of Patent: Apr. 3, 1990

[54] LASER RADIATION PROTECTED HORIZON SENSOR WITH SUCCESSIVE RESTSTRAHLEN

[75] Inventor: Robert C. Savoca, Ridgefield, Conn.

[73] Assignee: Barnes Engineering Company, Shelton, Conn.

[21] Appl. No.: 221,101

[22] Filed: Jul. 19, 1988

[51] Int. Cl.[4] .............................................. H01J 3/14
[52] U.S. Cl. .................................... 250/216; 250/347; 350/642
[58] Field of Search ............... 250/216, 226, 234, 235, 250/236, 347; 350/1.6, 1.7, 642

[56] References Cited

U.S. PATENT DOCUMENTS

| 4,088,884 | 5/1978 | Rast et al. | 350/642 |
| 4,328,421 | 5/1982 | Falbel | 250/347 |
| 4,772,080 | 9/1988 | Tustison | 350/1.6 |

*Primary Examiner*—David C. Nelms
*Attorney, Agent, or Firm*—Parmelee, Bollinger & Bramblett

[57] ABSTRACT

A horizon sensor which senses the horizon and produces a signal which indicates orientation with respect thereto is provided for scanning the horizon or distant line of discontinuity in optical radiation by a detector sensitive to such radiation and using the signals generated by the detector in crossing the line of discontinuity in optical radiation for attitude control of moving bodies. A scanner for the detector has two successive reflecting elements in optical alignment with the detector for reflectively applying predetermined optical radiation from a scanned field of view which includes the line of discontinuity in optical radiation. Reststrohlen mirrors which absorb and transmit predetermined laser radiation and reflect said predetermined optical radiation comprise the two successive reflecting elements which perform the scanning for protecting the horizon sensor from laser radiation damage by preventing the application of the laser radiation from reaching the detector or other sensitive components of the horizon sensor.

14 Claims, 2 Drawing Sheets

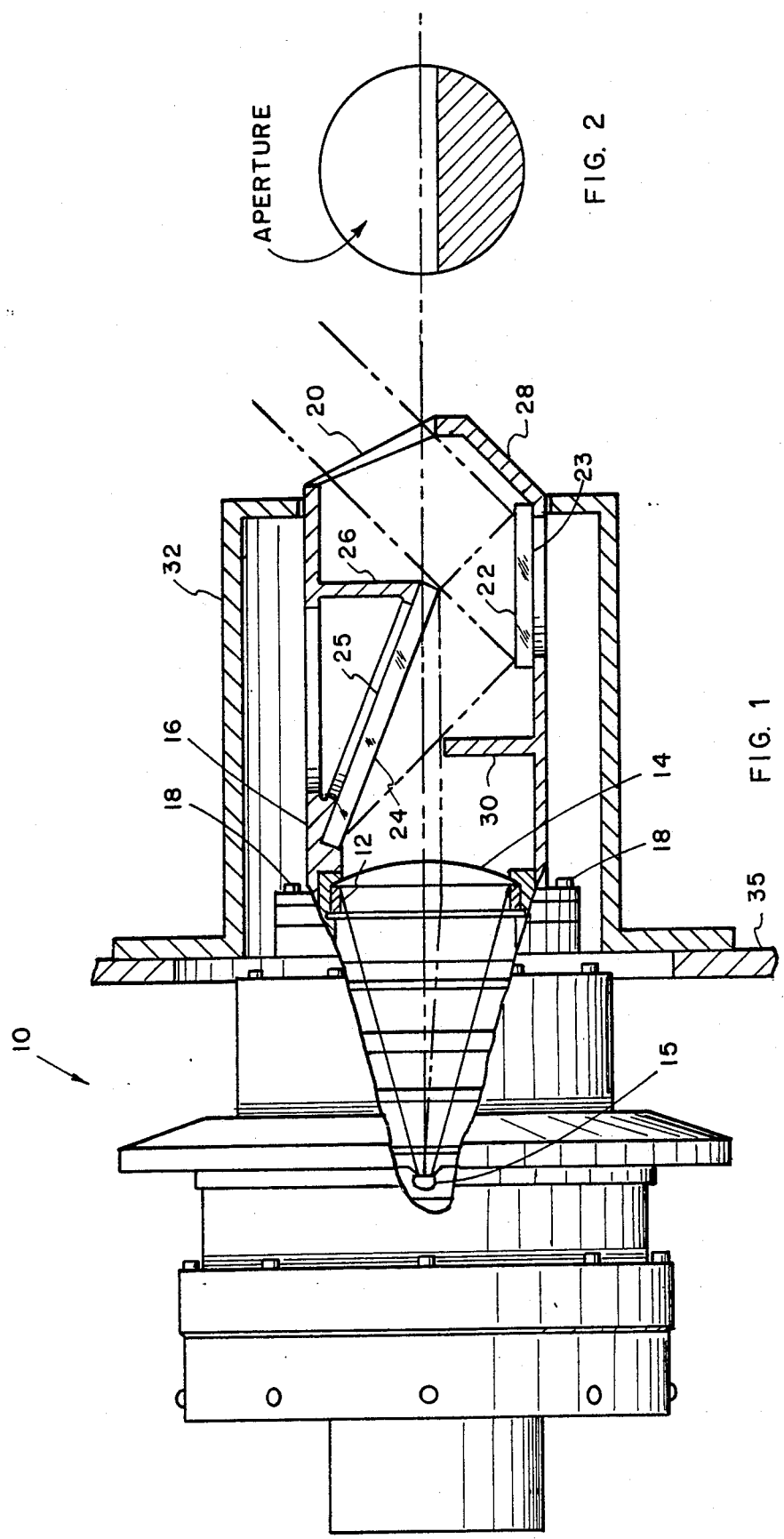

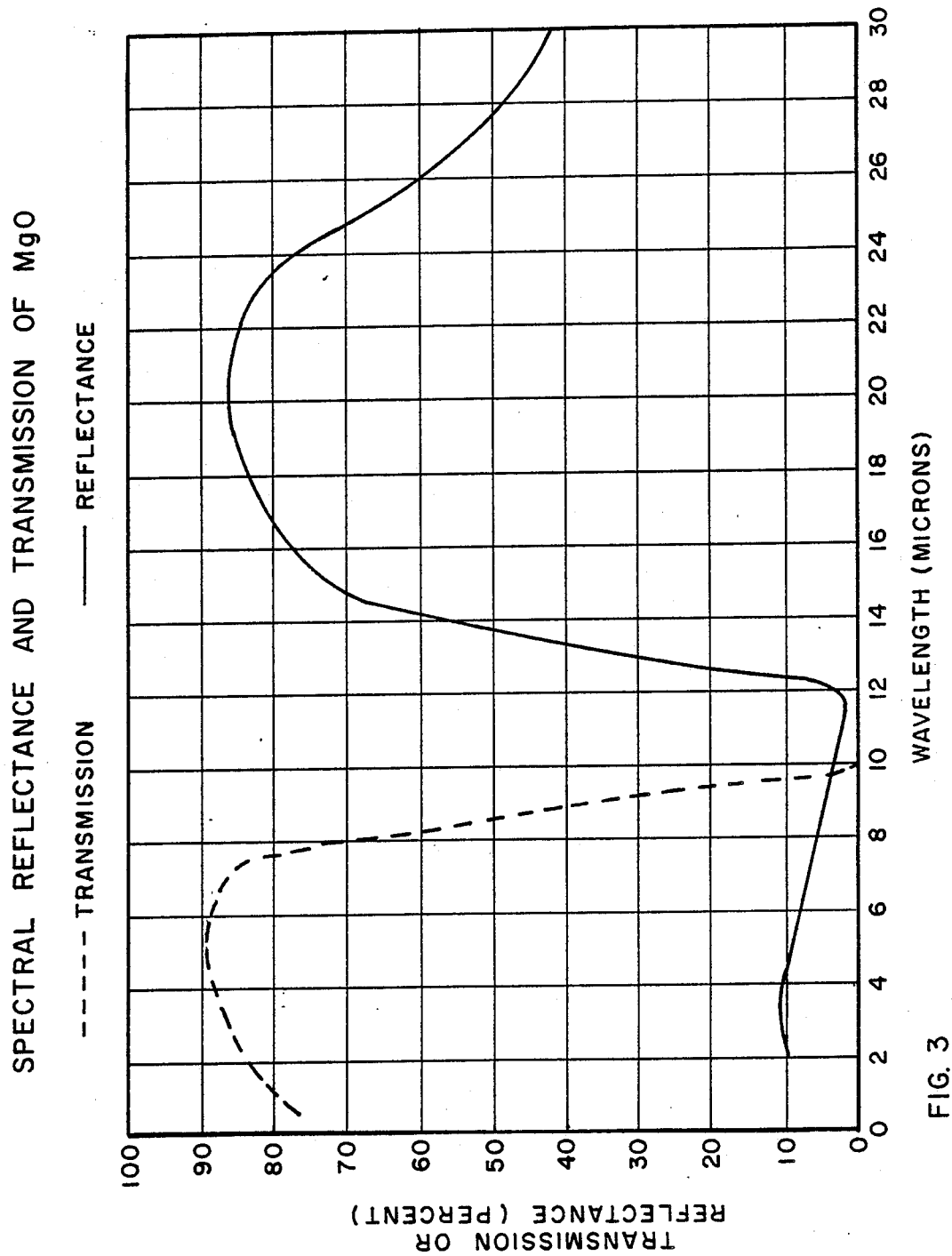

4,914,287

LASER RADIATION PROTECTED HORIZON SENSOR WITH SUCCESSIVE RESTSTRAHLEN

BACKGROUND OF THE INVENTION

This invention relates to horizon sensors using optical radiation for attitude control of bodies moving outside of the earth's atmosphere, and more particularly, to such sensors which are protected from being damaged by laser radiation.

Horizon sensors are frequently used for attitude control of spacecraft. The horizon represents a line of discontinuity between the earth's atmosphere and outer space which discontinuity is very marked particularly from high altitude and is characterized by a large difference in infrared radiation. Outer space is extremely cold and its infrared radiation is very low while the earth and the earth's atmosphere are relatively much warmer. The horizon sensor scans this line of thermal discontinuity with the abrupt change of optical radiation on either side of it and generates an electrical signal by continuously scanning a detector across the horizon to produce an electrical output in the form of square waves or regularly repeating rectangular pulses which are used with reference pulses as the scan passes predetermined points in the moving body in which the horizon sensor is positioned. By comparing the intervals between horizon crossings and the reference pulses an output signal is produced which gives information of the attitude of the vehicle with respect to the horizon.

Conical scan horizon sensors cause the small field of view of an infrared detector which may be around 1° or 2° in diameter to scan a large cone in space with a half angle of 30° or more which crosses the earth's horizon at two points. From the rectangular wave shape produced at the output of the infrared detector, the direction toward the center of the earth can be determined. An example of such a horizon sensor is shown and described in U.S. Pat. No. 3,020,407.

The aforesaid patent is a conical scan horizon sensor having a rotating optical assembly which scans a cone across the earth's horizon and applies the radiation received therefrom from a field of view to the infrared detector. The optical assembly and detector ca also be stationary with the scanning accomplished by the rotation of the satellite or another rotating element on the satellite to which the sensor is secured. The detectors which are used in horizon sensors are small, delicate and normally measure small amounts of radiation. In addition many horizon sensors use interference filters comprised of multiple thin film layers for only supplying predetermined radiation to the infrared detector, for example, radiation in the carbon dioxide band which band is commonly used in horizon sensing because of its uniform distribution around the earth. Thin film interference type filters have an extremely low heat capacity and can be easily damaged by high energy levels. There is currently increasing concern about horizon sensors being damaged by laser radiation because of the high energy levels contained in the laser radiation and due to the delicate components such as the detectors and/or interference filters which are, used in the horizon sensors. The threat of laser radiation occurs at wave lengths shorter than 14 microns at which the horizon sensors usually operate. Accordingly, it is essential to attenuate laser radiation impinging on the interference filters, detectors or other more fragile components of the horizon sensor.

SUMMARY

Accordingly, it is an object of this invention to provide horizon sensors which are protected from high energy laser radiation.

Another object of this invention is to provide laser radiation protection for horizon sensors which can be implemented easily on current models without materially altering the basic horizon sensor instruments.

In carrying out this invention in one illustrative embodiment thereof a laser radiation protected horizon sensor for scanning a distant line of discontinuity in optical radiation by a detector sensitive to such radiation and using the signals generated by the detector in crossing the line of discontinuity in optical radiation is provided for attitude control of moving bodies. A scanning means having two successive reflecting means in optical alignment with the detector are provided for reflectively applying predetermined optical radiation from a field of view scanned by said reflecting means which includes the line of thermal discontinuity to the detector. Reststrahlen mirrors which absorb and transmit predetermined laser radiation and reflect the predetermined radiation desired to be detected are provided as the two successive reflecting means for scanning and protecting the sensor from laser radiation damage by preventing the application of the laser radiation from reaching the detector or other sensitive components of the horizon sensor.

BRIEF DESCRIPTION OF THE DRAWINGS

The invention, together with further objects, aspects, advantages and features thereof will be more clearly understood from the following description taken in connection with the accompanying drawings.

FIG. 1 is a side elevational view partly in section and partly broken away of a conical scan horizon snesor with an optical system which includes two successive reflections from Reststrahlen mirrors before radiation from the field of view reaches a sensor to provide laser protection therefor in accordance with the present invention.

FIG. 2 illustrates the effective aperture of the sensor illustrated in FIG. 1.

FIG. 3 is a graph of reflectance or transmission vs wave length illustrating the spectral reflectance and transmission of magnesium oxide illustrating one form of Reststrahlen reflector which may be utilized in the present invention.

DESCRIPTION OF THE PREFERRED EMBODIMENTS

Referring now to FIG. 1, the laser protection apparatus in accordance with the present invention is illustrated as being attached to a horizon sensor, referred to generally with the reference character 10, which for example may be Model 13-102 manufactured by Barnes Engineering Company of Shelton, Connecticut. The horizon sensor 10 is a conventional conical scanning horizon sensor which has a rotating assembly 1 containing an objective lens 14 for an infrared detector 15. A cylindrical housing 16 is attached to the rotating assembly 12 by screws 18. The cylindrical housing 16 has an opening 20 which may be covered with a window if so desired providing an effective aperture of approximately 60% for the infrared detector 15 which aperture is shown in FIG. 2. The cylindrical housing 16 replaced the rotating scanning elements used in the aforesaid convention horizon sensor.

In accordance with the present invention the cylindrical housing 16 contains Reststrahlen mirrors 22 and 24 which may be made of magnesium oxide (MgO) or other suitable material the purpose of which will be explained hereinafter. A set of baffles 26, 28 and 30 are positioned in the cylindrical housing to insure that only the radiation rays undergoing reflections from both Reststrahlen mirrors 22 and 24 reach the lens 14. An interference filter (not shown) referred to above for passing predetermined infrared radiation to the infrared detector 15 for example, the carbon dioxide band from 14 to 16 microns, may be in the form of a coating which is placed directly on the objective lens 14 or on a separate substrate just in front or behind the objective lens 14.

A reflective stationary heat shield 32 surrounds the cylindrical housing 16 to shield the housing from laser radiation. The exterior surface of the baffle 28 may also be made reflective to reject laser radiation.

Normally, the rear surface 23 of Reststrahlen mirror 22 and 25 of Reststrahlen mirror 24 will be blackened and in good thermal contact with the rotating assembly 16. However, if the threat of laser radiation is expected to be in a spectral region where the Reststrahlen mirrors 22 and 24 are transparent, it will be advantageous to leave off the blacking and to open up the housing 16 so that the transmitted radiation leaves the rotating assembly 12 and is absorbed by the stationary heat shield 32 as is illustrated in FIG. 1. This relieves the heat load on the rotating assembly 12 which cannot be well heat sunk and transfers such heat to the stationary heat shield 32 which is shown can be well heat sunk to the spacecraft structure 35 on which it is mounted.

As has been pointed out horizon sensors usually operate at wave lengths longer than 14 microns for example, in the 14 to 16 micron range, while any threat of laser radiation occurs at shorter wave lengths with the longest being the $CO_2$ laser at 10.6 microns. In accordance with the present invention, all radiation viewed and seen through the aperture of the horizon sensor 10 undergoes two successive reflections from Reststrahlen mirrors 22 and 24 before being applied through the objective lens 14 and a thin film interference filter (not shown) onto the detector 15. Accordingly, the Reststrahlen mirrors 22 and 24 are utilized to attenuate the laser radiation prior to impingement on the interference filter and/or infrared detector or other more sensitive fragile components.

Reststrahlen reflective crystals are far more robust and can withstand considerably higher energy levels than components such, as thin, film interference filters or infrared detectors. Reststrahlen reflective crystals are transparent at short wave lengths up to a strong absorption band after which they become highly reflective. Magnesium oxide (MgO) is a good Reststrahlen reflector for the purposes of the present invention. The spectral transmission and reflectivity of MgO are shown in FIG. 3. MgO is highly reflective beyond 14 microns while being either transparent or absorbing at shorter wave lengths. Accordingly, the use of Reststrahlen reflective crystals contains a decided advantage over interference filters in that any absorption takes place in bulk material rather than in, thin film. In addition, the reflector can be well heat sunk so that additional absorption may take place in another material while a transmitter cannot be effectively heat sunk. Accordingly, the Reststrahlen mirror can withstand much higher powers of radiant energy than an interference filter.

As will be seen in FIG. 3 the reflectivity of MgO at 10.6 microns is approximately 2%. In the transparent region, the reflectivity rises to 10% which is due to the Reststrahlen mirror having two surfaces and is attributed to reflection from the back surface which can be suppressed by coating that back surface with an absorber thereby reducing reflectivity to 5%. The two successive reflections of laser radiation in accordance with the present invention will attenuate any laser radiation threat irradiance by $0.02^2$ to $0.05^2$ or 0.0004 to 0.0025. Such attenuation will effectively protect the horizon sensor 10 from any presently known laser threats.

Although the present invention is described in connection with a conical scan horizon sensor, it will be appreciated that the two successive reflections from Reststrahlen mirrors embodied in the invention may be applied to other type horizon sensors, for example, spin-stabilized horizon sensors with little modification and to balance type horizon sensors which continually view the horizon with possibly minor variations by enlarging the size of the Reststrahlen mirrors but retaining the two successive reflections therefrom before the radiation is applied through an interference filter and/or infrared detector. Thus, the particular configuration of size and spacing of the Reststrahlen mirrors will depend on the type of horizon sensor used and the field of view desired. The particular material used in the Reststrahlen mirrors will depend on the wave lengths to be reflected, absorbed and transmitted which may vary somewhat in different applications. As pointed out MgO is very suitable when the sensor is sensitive and operates in the $CO_2$ band.

In the present invention, the prior optical elements used for scanning the detector across the line of discontinuity are simply removed and replaced with the two Restrahlen mirrors which in effect do the scanning as well as effectively removing the laser radiation. Accordingly, little modification is required on existing horizon sensors to provide the laser protection. The prior optical scanning elements are simply replaced by the Reststrahlen mirrors.

Since other changes and modifications varied to fit particular operating requirements and invironments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A laser radiation protected horizon sensor for scanning a distant line of discontinuity in optical radiation by a detector sensitive to such radiation and using the signals generated by the detector in crossing the line of discontinuity in optical radiation for attitude control of moving bodies comprising:

a detector sensitive to optical radiation,
a rotary scanning means having two successive Reststrahlen reflecting means in optical alignment with said detector for scanning and reflectively applying predetermined optical radiation from the field of view scanned by said two successive Reststrahlen reflecting means which includes said line of discontinuity, said Reststrahlen reflecting means reflecting radiation from said line of discontinuity in optical radiation and attenuating other optical radiation by preventing significant amounts of laser radiation from reaching said detector.

2. The laser protected horizon sensor as claimed in claim 1 wherein said Reststrahlen reflecting means comprise first and second Reststrahlen mirrors which are mounted in a housing on said horizon sensor, said housing having an opening facing said first Reststrahlen mirror mounted in said housing for receiving optical radiation from a field of view which is directly applied to said first Reststrahlen mirror, said second Reststrahlen mirror mounted in an opposed position in said housing with respect to said first Reststrahlen mirror for reflecting received optical radiation from said first Reststrahlen mirror, said second Reststrahlen mirror being in optical alignment with said detector from applying optical radiation from said second Reststrahlen mirror to said detector.

3. The laser protected horizon sensor as claimed in claim 2 having a plurality of baffles in said housing positioned with respect to said first and second Reststrahlen mirrors to insure that only optical radiation reflected from said Reststrahlen mirrors reach said detector.

4. The laser protected horizon sensor as claimed in claim 2 wherein said first and second Reststrahlen mirrors have front reflecting surfaces and rear surfaces, said rear surfaces being blackened and in good thermal contact with said housing.

5. The laser protected horizon sensor as claimed in claim 2 wherein said first and second Reststrahlen mirrors have front reflecting surfaces and rear surfaces, said first and second Reststrahlen mirrors being mounted in said housing such that said rear surfaces are exposed, and heat shield means positioned behind said exposed rear surfaces of said first and second Reststrahlen mirrors so that radiation transmitted by said Reststrahlen mirrors is absorbed by said heat shield means.

6. The laser protected horizon sensor as claimed in claim 1 wherein said Reststrahlen mirror means comprises magnesium oxide.

7. The laser protected horizon sensor as claimed in claim 2 wherein said Restrahlen mirror means comprises magnesium oxide.

8. The laser protected horizon sensor as claimed in claim 2 wherein said housing containing said Reststrahlen mirror performs the scanning of said line of discontinuity in optical radiation by the spinning movement of a satellite in which said housing is mounted.

9. The laser protected horizon sensor as claimed in claim 2 wherein said housing is a rotary assembly which is rotated to perform said scanning function.

10. A laser radiation protected horizon sensor for scanning a distant line of discontinuity in optical radiation by a detector sensitive to such radiation and using the signals generated by the detector in crossing the line of discontinuity in optical radiation for attitude control of moving bodies, comprising:

a housing assembly having a first end mounted on said horizon sensor in alignment with said detector and an opening in said second end, first and second Reststrahlen mirrors mounted in said housing in optical alignment with said detector such that optical radiation passing through said opening in said second end of said housing assembly is applied to said detector after two successive reflections from said first and second Reststrahlen mirrors, means for scanning said housing assembly across said line of discontinuity in optical radiation, said first and second Reststrahlen mirrors absorbing and transmitting predetermined laser radiation while reflecting desired optical radiation from said line of discontinuity in optical radiation.

11. The laser protected horizon sensor as claimed in claim 10 wherein said first and second Reststrahlen mirrors are magnesium oxide.

12. The laser protected horizon sensor as claimed in claim 11 wherein housing assembly is surrounded by a heat shield.

13. The laser protected horizon sensor as claimed in claim 12 wherein said first and second Reststrahlen mirrors have front and rear surfaces and said rear surfaces are mounted in said housing to be exposed to said heat shield whereby laser radiation transmitted by said Reststrahlen mirrors is absorbed by said heat shield.

14. The laser protected horizon sensor as claimed in claim 10 wherein said housing assembly includes a plurality of baffles mounted in said housing assembly for blocking any radiation from being applied to said detector which is not reflected by said first and second Reststrahlen mirrors.

* * * * *